US008548670B2

(12) United States Patent
Harumoto et al.

(10) Patent No.: US 8,548,670 B2
(45) Date of Patent: Oct. 1, 2013

(54) FUEL-SAVING DRIVING DIAGNOSTIC DEVICE, FUEL-SAVING DRIVING DIAGNOSTIC SYSTEM, TRAVEL CONTROL DEVICE, FUEL-SAVING DRIVING RATING DEVICE, AND FUEL-SAVING DRIVING DIAGNOSTIC METHOD

(75) Inventors: Satoshi Harumoto, Kobe (JP); Kouei Kiyo, Kobe (JP); Shojiro Takeuchi, Tokyo-to (JP); Naoki Miura, Toyokawa (JP); Masaki Nakamura, Okazaki (JP); Hiroaki Sugiura, Okazaki (JP); Yoshio Yamatani, Okazaki (JP); Junichi Nonomura, Okazaki (JP)

(73) Assignees: Fujitsu Ten Limited, Kobe-shi (JP); Toyota Jidosha Kabushiki Kaisha, Toyota (JP); Aisin AW Co., Ltd., Anjo (JP)

( * ) Notice: Subject to any disclaimer, the term of this patent is extended or adjusted under 35 U.S.C. 154(b) by 275 days.

(21) Appl. No.: 13/056,896

(22) PCT Filed: Jul. 30, 2009

(86) PCT No.: PCT/JP2009/063601
§ 371 (c)(1),
(2), (4) Date: Jan. 31, 2011

(87) PCT Pub. No.: WO2010/013787
PCT Pub. Date: Feb. 4, 2010

(65) Prior Publication Data
US 2011/0137512 A1   Jun. 9, 2011

(30) Foreign Application Priority Data

Jul. 31, 2008   (JP) .................................. 2008-198386

(51) Int. Cl.
*G06F 7/00* (2006.01)
*G01M 17/00* (2006.01)

(52) U.S. Cl.
USPC ............. 701/29.1; 701/31.4; 701/51; 701/52; 701/54; 701/62; 701/65; 701/103

(58) Field of Classification Search
USPC ................. 701/29, 103, 31.4, 51, 52, 54, 62, 701/64, 65; 477/109, 111, 120, 124, 78, 477/80; 440/1, 84, 86; 123/480, 493
See application file for complete search history.

(56) References Cited

U.S. PATENT DOCUMENTS 5,189,621 A  *  2/1993  Onari et al. ................... 701/102
5,638,790 A  *  6/1997  Minowa et al. ............... 123/436

(Continued)

FOREIGN PATENT DOCUMENTS

| JP | A-10-169765 | 6/1998 |
| JP | A-2002-362185 | 12/2002 |

(Continued)

OTHER PUBLICATIONS

Written Opinion of the International Searching Authority issued in Application No. PCT/JP2009/063601; Dated Nov. 10, 2009 (With Translation).
International Search Report issued in Application No. PCT/JP2009/063601; Dated Nov. 10, 2009 (With Translation).

(Continued)

*Primary Examiner* — Ian Jen
(74) *Attorney, Agent, or Firm* — Oliff & Berridge, PLC

(57) ABSTRACT

A shift lever position determining unit determines whether a shift lever position of a vehicle satisfies predetermined conditions. If the shift lever position is determined to satisfy the predetermined conditions, a travel distance adding-up unit adds up an optimum shift lever position travel distance. If the shift lever position is determined not to satisfy the predetermined conditions, the travel distance adding-up unit adds up an inappropriate shift lever position travel distance. A fuel-saving driving rating unit rates driving by a driver based on each added-up value added up by the travel distance adding-up unit. A fuel-saving driving advice generating unit notifies the driver of fuel-saving driving advice together with a rating result in accordance with the rating result. Therefore, it is possible to encourage the driver to select an optimum shift lever position with high fuel efficiency and thereby to improve the driver's knowledge and awareness of the fuel-saving driving.

13 Claims, 10 Drawing Sheets

(56) References Cited

U.S. PATENT DOCUMENTS

| | | | |
|---|---|---|---|
| 6,035,735 A * | 3/2000 | Graf et al. | 74/335 |
| 6,876,915 B2 * | 4/2005 | Kuramochi et al. | 701/96 |
| 2005/0096836 A1 | 5/2005 | Minami et al. | |
| 2011/0137512 A1 * | 6/2011 | Harumoto et al. | 701/29 |

FOREIGN PATENT DOCUMENTS

| | | |
|---|---|---|
| JP | A-2003-331380 | 11/2003 |
| JP | A-2004-360658 | 12/2004 |
| JP | A-2007-326574 | 12/2007 |

\* cited by examiner

FIG.2

| ITEM NO. | ECO LAMP LIGHTING DETERMINATION ITEM | CURRENT VALUE | DIAGNOSIS CONDITION VALUE (INITIAL VALUE) | | DIAGNOSIS CONDITION VALUE (CHANGED VALUE) | |
|---|---|---|---|---|---|---|
| 1 | VEHICLE SPEED [km/h] | v | LOWER LIMIT VALUE | UPPER LIMIT VALUE | LOWER LIMIT VALUE | UPPER LIMIT VALUE |
| | | | v1 | v2 | v3 | v4 |
| 2 | ACCELERATOR OPENING [deg] | θ | LOWER LIMIT VALUE | UPPER LIMIT VALUE | LOWER LIMIT VALUE | UPPER LIMIT VALUE |
| | | | θ1 | θ2 | θ3 | θ4 |
| 3 | SHIFT LEVER POSITION | D RANGE | D RANGE | | D RANGE OR B RANGE | |
| 4 | SHIFT MODE STATE | NORMAL MODE | NORMAL MODE OR ECO MODE | | NORMAL MODE, ECO MODE OR SNOW MODE | |
| ⋮ | ... | ... | ... | | ... | |

FIG.3

| OPTIMUM SHIFT LEVER POSITION SELECTION DRIVING SCORE | | ADVICE EXAMPLE |
|---|---|---|
| LOWER LIMIT VALUE [%] | UPPER LIMIT VALUE [%] | |
| 0 | 50 | YOU ARE DRIVING EXTREMELY ECO-UNFRIENDLY. PLEASE TRY DRIVING MORE ECO-FRIENDLY. |
| 50 | 80 | YOU ARE DRIVING ECO-FRIENDLY. PLEASE AIM AT DRIVING MORE ECO-FRIENDLY. |
| 80 | NA | YOU ARE DRIVING EXTREMELY ECO-FRIENDLY. PLEASE CONTINUE TO DRIVE ECO-FRIENDLY. |

FIG.4

| INAPPROPRIATE SHIFT LEVER POSITION SELECTION DRIVING SCORE | | ADVICE EXAMPLE |
|---|---|---|
| LOWER LIMIT VALUE [%] | UPPER LIMIT VALUE [%] | |
| 0 | 20 | ATTENTION! YOU ARE DRIVING ECO-UNFRIENDLY. PLEASE TRY DRIVING MORE ECO-FRIENDLY. |
| 20 | 60 | WARNING! YOU ARE DRIVING VERY ECO-UNFRIENDLY. PLEASE TRY DRIVING MORE ECO-FRIENDLY. |
| 60 | NA | ALARM! YOU ARE DRIVING EXTREMELY ECO-UNFRIENDLY. TRY DRIVING MORE ECO-FRIENDLY. |

FUEL-SAVING DRIVING DIAGNOSTIC DEVICE, FUEL-SAVING DRIVING DIAGNOSTIC SYSTEM, TRAVEL CONTROL DEVICE, FUEL-SAVING DRIVING RATING DEVICE, AND FUEL-SAVING DRIVING DIAGNOSTIC METHOD

FIELD

The present invention relates to a fuel-saving driving diagnostic device, a fuel-saving driving diagnostic system, a travel control device, a fuel-saving driving rating device, and a fuel-saving driving diagnostic method for diagnosing and rating fuel-saving driving based on the shift lever selection during driving by a driver of a vehicle and notifying the driver of a rating result to raise awareness of the fuel-saving driving.

BACKGROUND

In recent years, fuel saving characteristics of vehicles are again regarded as important, as the global environmental issues are drawing more attention. As for the global environmental issues, measures need to be promptly taken against global warming. Thus, improvements to enhance fuel-saving performance have repeatedly been made for vehicles with engines that emit greenhouse gases such as carbon dioxide to reduce emissions of greenhouse gases through improvement of fuel efficiency.

However, no matter how high the original fuel saving characteristics of the vehicle are, if a driver's driving manner is against fuel saving, for example, if the vehicle is driven with an inappropriate selection position of the shift lever, driving of the vehicle is controlled with a shift not suited to road conditions and so wasteful fuel consumption is caused, making high fuel saving characteristics of the vehicle meaningless. Thus, there have been various conventional techniques for notifying the driver of an inappropriate shift lever position when the driver selects such an inappropriate shift lever position for driving so as to make a contribution to fuel-saving with the shift lever selection, even if the contribution is so small.

According to a conventional technique, for example, an excessive driving force generated when the shift change to a higher gear is possible is calculated by, calculating a difference between the current fuel consumption and a fuel consumption expected to be achieved when a higher gear is selected (this difference is referred to as "excessive fuel consumption caused by the omission of shift-up"), and converting the excessive fuel consumption to the driving force to obtain driving-force equivalent. Based on the excessive fuel consumption and the driving-force equivalent, it is possible to present to the driver how much fuel and driving force are wasted when an inappropriate shift lever position is selected during driving, for example, when second gear is selected though higher gear can be selected.

CITATION LIST

Patent Literature
Patent Literature 1: Japanese Patent Application Laid-open No. 20.07-326574

SUMMARY

Technical Problem

However, the above conventional techniques have the following problems. When the excessive fuel consumption caused by the omission of shift-up is calculated and the calculated excessive fuel consumption or its driving-force equivalent is simply notified to the driver, he/she cannot make an absolute and fair judgment about the information about fuel consumption. This is because the driving conditions of a vehicle vary widely with situation, and the driving conditions have a large influence on fuel consumption.

For the improvement of fuel efficiency, the improvement in driver's shift lever selection operations and improvement in driver's awareness of the fuel-saving driving are required. However, because of the above-mentioned problems, conventional technologies cannot realize evaluation of driver's shift lever selection operations based on an objective, fair standard. Thus, the conventional technologies cannot generate motivation for improvement in driver's shift lever selection/operation, and raise awareness and increase knowledge of the driver for the fuel-saving driving.

The fuel-saving driving diagnostic device, the fuel-saving driving diagnostic system, the travel control device, the fuel-saving driving rating device, and the fuel-saving driving diagnostic method disclosed herein have been made to solve the above problem (issue) and an object thereof is to evaluate shift lever position selection operations of the driver based on fair criteria and to motivate the driver to improve his/her shift lever position selection operations and to increase the driver's knowledge and awareness of fuel-saving driving.

Solution to Problem

To solve the problems as described above and to achieve an object, according to a fuel-saving driving diagnostic device, a fuel-saving driving diagnostic system, a travel control device, a fuel-saving driving rating device and a fuel-saving driving diagnostic method as disclosed: it is determined whether the shift lever selection position in the vehicle satisfies the shift lever selection conditions, which are conditions of a shift lever selection position for determining that a vehicle is performing fuel-saving driving; it is determined whether a travel situation of the vehicle is a predetermined travel situation; it is determined whether to determine whether the shift lever selection position of the vehicle satisfies the shift lever selection conditions according to the result of determination to diagnose the fuel-saving driving; the fuel-saving driving is rated based on a determination target travel distance, which is a travel distance of the vehicle selected as a target for the determination on whether the shift lever selection position of the vehicle satisfies the shift lever selection conditions, and a travel distance included in the determination target travel distance for which it is determined that the shift lever selection position in the vehicle satisfies the shift lever selection conditions; fuel-saving driving advice is generated based on a rating result; and the rating result and the fuel-saving driving advice are notified to the driver.

Advantageous Effects of Invention

The fuel-saving driving diagnostic device, fuel-saving driving diagnostic system, travel control device, fuel-saving driving rating device, and fuel-saving driving diagnostic method as disclosed herein have the effect to enable an absolute, objective, and fair determination of the information about fuel consumption and thereby to motivate the driver to improve his/her driving operations concerning the shift lever selection of a vehicle and to increase the driver's knowledge and awareness about fuel-saving driving.

BRIEF DESCRIPTION OF DRAWINGS

FIG. 2 is a diagram illustrating an example of an eco lamp lighting determining condition table.

FIG. 3 is a diagram illustrating an example of a fuel-saving driving advice table.

FIG. 4 is a diagram illustrating an example of the fuel-saving driving advice table.

DESCRIPTION OF EMBODIMENTS

The following is a detailed description of an example of a fuel-saving driving diagnostic device, a fuel-saving driving diagnostic system, a travel control device, a fuel-saving driving rating device and a fuel-saving driving diagnostic method according to an embodiment with reference to the accompanying drawings. In the following description of the example of the embodiment, a vehicle driven by a gasoline engine or the like using fossil fuel as fuel (energy) will be described by way of example.

However, the application of the invention is not limited to the application for those vehicles driven using fossil fuel as a fuel (energy), such as those having gasoline engine. The invention is applicable to a hybrid car which has both a gasoline engine (or some other engine using fossil fuel as energy) and a drive motor (hereinafter, referred to as the motor) and which runs by switching driving sources in accordance with driving conditions. The invention is widely and generally applicable to any vehicles driven by energy, e.g., vehicles that run by using a motor as a driving force such as electric vehicles and vehicles powered by a fuel cell.

[Example of an Embodiment]

Figure 1:
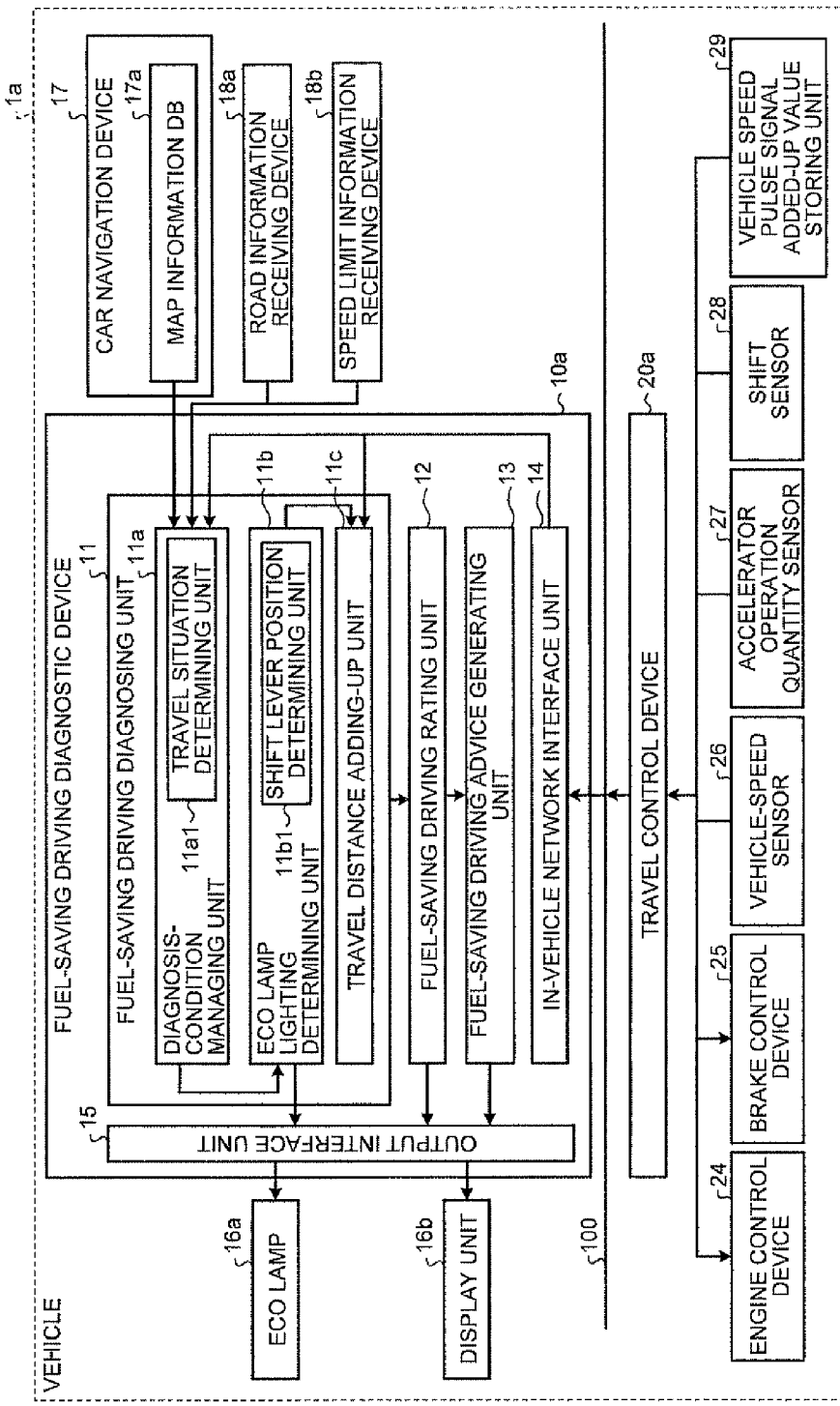
FIG. 1 is a block diagram illustrating the configuration of a fuel-saving driving diagnostic device and related devices of a vehicle according to an example of an embodiment.

An example of an embodiment of a fuel-saving driving diagnostic device, a fuel-saving driving diagnostic system, a travel control device, a fuel-saving driving rating device and a fuel-saving driving diagnostic method is described with reference to FIGS. 1 to 12. FIG. 1 is a block diagram illustrating the configuration of a fuel-saving driving diagnostic device and related devices of a vehicle 1a according to an example of an embodiment.

As shown in FIG. 1, a fuel-saving driving diagnostic device 10a includes a fuel-saving driving diagnosing unit 11, a fuel-saving driving rating unit 12, a fuel-saving driving advice generating unit 13, an in-vehicle network interface unit 14 and an output interface unit 15. The fuel-saving driving diagnostic device 10a is connected to a travel control device 20a via the in-vehicle network interface unit 14 and an in-vehicle network 100. Further, the fuel-saving driving diagnostic device 10a is connected to an eco lamp 16a and a display unit 16b via the output interface unit 15. The display unit 16b has a display screen. The eco lamp 16a has been conventionally known and is turned on when eco driving ("eco" is an abbreviation of "ecology" and "eco driving" refers to ecologically-friendly fuel-saving driving) satisfying various lighting conditions is performed.

The travel control device 20a is a computer that controls the driving of the vehicle 1a. The travel control device 20a is connected to an engine control device 24 that controls a gasoline engine to drive the vehicle and a brake control device 25. The brake control device 25 controls a mechanical brake (a disk brake or drum brake) in accordance with a brake operation of the driver.

The travel control device 20a is also connected to a vehicle-speed sensor 26 that senses the current speed of the vehicle, an accelerator operation quantity sensor 27 that senses the current quantity of the accelerator operation of the driver, a shift sensor 28 that senses the current shift lever position of the vehicle and the current shift mode state of the vehicle, and a vehicle speed pulse signal added-up value storing unit 29.

The vehicle speed pulse signal added-up value storing unit 29 stores a vehicle speed pulse signal added-up value that is incremented by 1 every time a pulse sensor provided on the inner diameter of each wheel of the vehicle 1a senses a vehicle speed pulse signal as the wheel rotates 360 degrees. In other words, the vehicle speed pulse signal added-up value is a value obtained by accumulating the number of rotations of the wheel. The travel distance of the vehicle 1a in a predetermined period of time (100 milliseconds, for example) can be calculated by calculating the difference in vehicle speed pulse signal added-up values obtained before and after the predetermined period of time, and multiplying the difference with the outer circumferential length of the wheel.

The fuel-saving driving diagnosing unit 11 includes a diagnosis-condition managing unit 11a, an eco lamp lighting determining unit 11b, and a travel distance adding-up unit 11c. The diagnosis-condition managing unit 11a manages the conditions under which driving is determined to be eco driving that turns on the eco lamp 16a, that is, the eco lamp lighting conditions. More specifically, an eco lamp lighting determining condition table illustrated in FIG. 2 is stored to manage the conditions for the shift lever selection position to be determined to be fuel-saving driving.

The fuel-saving driving diagnosing unit 11 also includes a travel situation determining unit 11a1 that determines whether the vehicle 1a is in a predetermined travel situation from road conditions and traffic conditions received by a road information receiving device 18a, speed limit information received by a speed limit information receiving device 18b, and various kinds of vehicle control information acquired by the travel control device 20a.

The eco lamp lighting determining condition table illustrated in FIG. 2 has, for example, the vehicle speed [km/h], the accelerator opening (the angle of the accelerator opening conducted by the driver) θ [deg], the shift lever position, the shift mode state and the like stored as the determination items for allowing the eco lamp 16a to light up. The eco lamp lighting determining condition table stores the current values of the respective determination items, the diagnosis condition values (initial values), and the diagnosis condition values (changed values).

The current value v of the vehicle speed, the current value θ of the accelerator opening, the shift lever position, and the shift mode state in the eco lamp lighting determining condition table are values that are acquired from the vehicle-speed sensor 26, the accelerator operation quantity sensor 27, and the shift sensor 28 via the travel control device 20a every 100 milliseconds, for example.

The shift lever position is "P" (Parking), "R" (Reverse), "D" (Drive; normal drive), "N" (Neutral), "B" (Break; regenerative braking by the motor), "2" (Second; second gear position), "1" (First: first gear position), or the like. Normally, selecting "D" as the shift lever position for driving leads to fuel-saving driving.

The shift mode state provides a function to complement the shift lever selection and adjust the driving of the vehicle 1a, and this function can be switched on and off with a switch attached to the shift lever. The shift mode state is a "normal mode", an "eco mode" (a state where fuel-saving driving is performed), a "sport mode" (a state where sporty-type driving is performed), a "snow mode" (a state where safe driving is secured in the snow), or the like. Normally, selecting the "normal mode" or the "eco mode" as the shift mode state for driving leads to fuel-saving driving.

The diagnosis condition values (initial values) in the eco lamp lighting determining condition table are values that are set in advance. The diagnosis condition values (changed values) are values changed from the diagnosis condition values (initial values) by the diagnosis-condition managing unit 11a based on map information supplied from map information DB 17a of a car navigation device 17, road conditions and traffic conditions received by the road information receiving device 18a, and speed limit information received by the speed limit information receiving device 18b. The diagnosis condition values (the changed values) serve as values that relax or tighten the diagnosis condition values (the initial values).

The reason that the diagnosis-condition managing unit 11a relaxes or tightens the diagnosis condition values in accordance with the map information and the road and traffic conditions as described above is as follows. The lighting of the eco lamp 16a is information that indicates fuel-saving driving of the driver. If the lighting state of the eco lamp 16a is determined without consideration for the road environment or the traffic conditions in which the vehicle 1a is running, fair determination cannot be made based on the lighting state of the eco lamp 16a when the eco-friendliness of the driving of the driver is judged.

For example, when the vehicle 1a goes uphill, a larger torque than the torque required for flatland driving is required for acceleration. At a junction of roads, it is necessary to accelerate considerably after shift-down, so as to follow the vehicles running on the main lane.

Therefore, if the situation at the driving point at which the vehicle 1a is running is not taken into account in the determination of the driving, eventual scoring (rating) of the driving based on the result of determination will be advantageous to some drivers and disadvantageous to others, and thus will be unfair. To eliminate this unfairness, the diagnosis-condition managing unit 11a relaxes or tightens the diagnosis condition values in accordance with the map information and road and traffic conditions, thereby realizing the fair diagnoses and rating to the satisfaction of the driver, i.e., the user.

When relaxing or tightening the diagnosis condition value according to the map information, road conditions, traffic conditions and speed-limit information, the upper limit or the lower limit of the diagnosis condition value as represented by a numerical value is increased/decreased by approximately 20% to 30%, for example, according to the condition. With regard to the shift lever position and the shift mode state, a condition is added or deleted.

The road information receiving device 18a is a VICS (registered trademark) receiver or a DSRC (Dedicated Short Range Communications: Road-to-Vehicle Communications) device. The speed limit information receiving device 18b may be a device that recognizes the speed limit indication on the road surface or a signpost, a device that receives speed limit information of its current position through a radio frequency, or a device that acquires speed limit information of its current position based on the map information.

The eco lamp lighting determining unit 11b includes a shift lever position determining unit 11b1. Particularly, the shift lever position determining unit 11b1 determines whether the current shift lever position of the vehicle is acquired via the travel control device 20a satisfies the diagnosis condition values (the changed values) illustrated as examples in FIG. 2. This determination is a fuel-saving driving diagnosis.

The eco lamp lighting determining unit 11b also determines whether the current vehicle speed, the current accelerator opening, and the shift mode state (these items and the current shift lever position of the vehicle 1a is are called the eco lamp lighting determination items) of the vehicle 1a acquired via the travel control device 20a satisfy the respective diagnosis condition values (the changed values) illustrated as examples in FIG. 2. This determination is a fuel-saving driving diagnosis. If all the eco lamp lighting determination items satisfy the diagnosis condition values (the changed values), the eco lamp lighting determining unit 11b lights the eco lamp 16a.

When the road conditions and the traffic conditions are in normal states, the eco lamp lighting determining unit 11b and the shift lever position determining unit 11b1 determine whether the eco lamp lighting determination items are within the ranges of the lower limit values and the upper limit values of the respective diagnosis condition values (the initial values) illustrated as examples in FIG. 2.

The travel distance adding-up unit 11c adds the 100-msec travel distance acquired from the vehicle speed pulse signal added-up value storing unit 29 via the travel control device 20a every 100 milliseconds to a one-trip travel distance, an optimum shift lever position travel distance, and an inappropriate shift lever position travel distance.

The one-trip travel distance is the distance the vehicle 1a travels since the ignition is turned on until the ignition is turned off. The optimum shift lever position travel distance is the distance traveled in the one-trip travel distance with the eco lamp 16a being on and the diagnosis conditions being satisfied by the diagnosis result of the shift lever position. The inappropriate shift lever position travel distance is the distance traveled in the one-trip travel distance with the diagnosis conditions being unsatisfied by the diagnosis result of the shift lever position.

Instead of the one-trip travel distance, the travel distance of some fixed period may be adopted and, for example, the travel distance of one travel from start to stop may be adopted. In this way, driving can be diagnosed more finely.

The fuel-saving driving rating unit 12 of the fuel-saving driving diagnostic device 10a rates driving of the driver based on each added-up value added up by the travel distance adding-up unit 11c. For example, an optimum shift lever position driving score is calculated according to the following equation.

[formula 1]

$$\frac{\text{optimum shift lever position travel distance}}{\text{one-trip travel distance}} \times 100 \, [\%] \quad (1)$$

An inappropriate shift lever position driving score is calculated according to the following equation.

[formula 2]

$$\text{inappropriate shift lever position driving score} \quad (2)$$
$$\frac{\text{inappropriate shift lever position travel distance}}{\text{one-trip travel distance}} \times 100 \, [\%]$$

The optimum shift lever position driving score is a "good" score positively evaluating the fuel-saving driving performed by the driver. On the other hand, the inappropriate shift lever position driving score is a "bad" score measuring negligence of fuel-saving driving by the driver.

Figure 9:
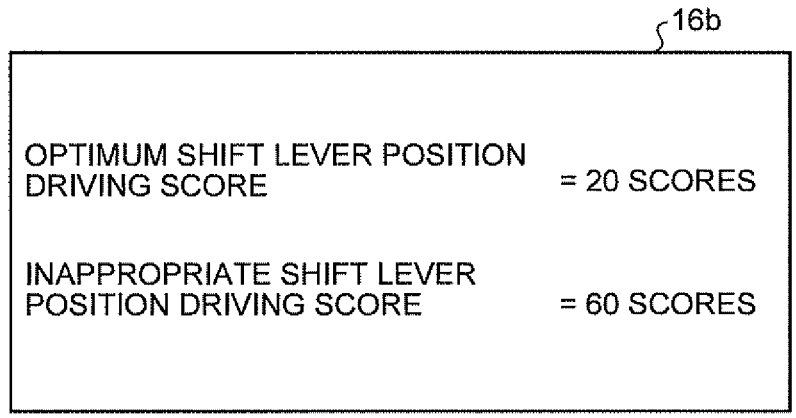
FIG. 9 is a diagram illustrating an exemplary display format of an optimum shift lever position driving score and an inappropriate shift lever position driving score.

Then, as illustrated in FIG. 9, the fuel-saving driving rating unit 12 causes the display unit 16b to display the optimum shift lever position driving score and the inappropriate shift lever position driving score. Alternatively, a total score may be calculated, with the "good" score being a point-addition component and the "bad" score being a point-deduction component.

As described above, the fuel-saving driving of the driver is rated by calculating the respective scores based on the respective travel distances. In this manner, fair, clear, and satisfactory rating results can be presented to the driver.

Figure 10:
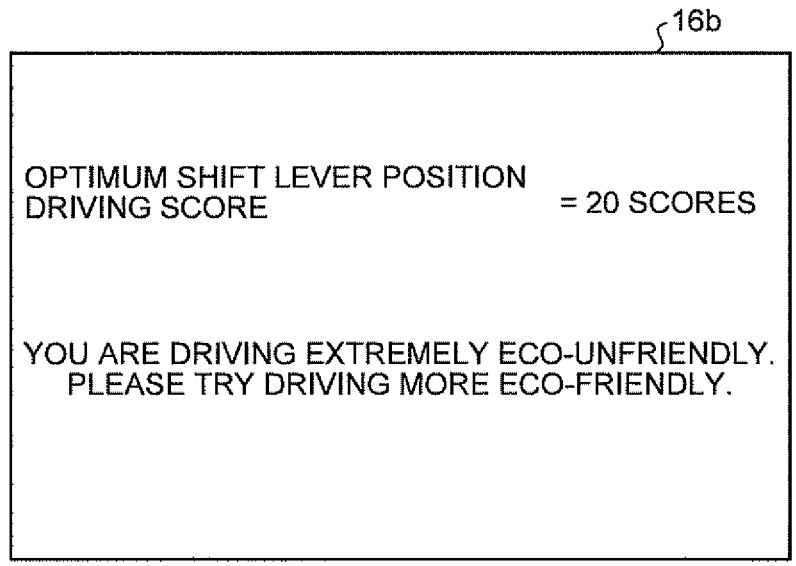
FIG. 10 is a diagram illustrating an exemplary display format of fuel-saving driving advice.
Figure 11:
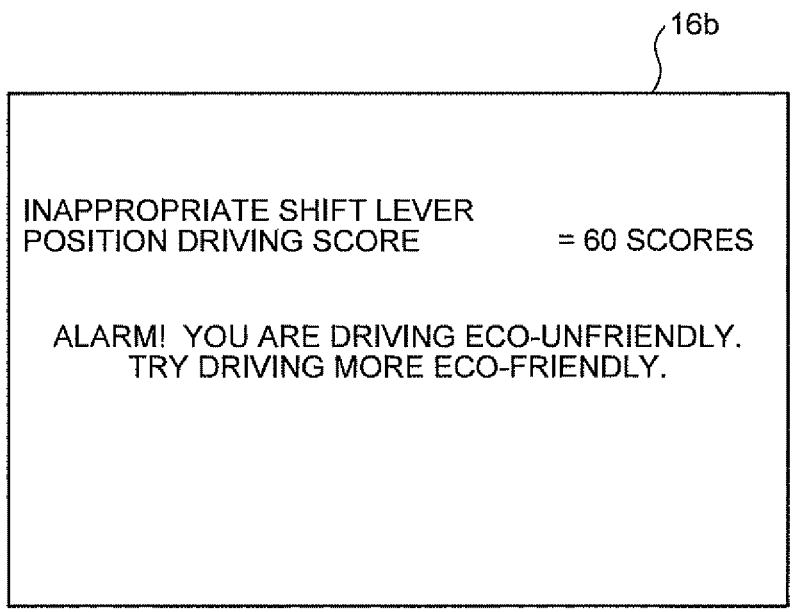
FIG. 11 is a diagram illustrating an exemplary display format of fuel-saving driving advice.

The fuel-saving driving advice generating unit 13 of the fuel-saving driving diagnostic device 10a causes the display unit 16b to display fuel-saving driving advice illustrated as examples in FIG. 3, in accordance with the optimum shift lever position driving score. The fuel-saving driving advice generating unit 13 also causes the display unit 16b to display fuel-saving driving advice illustrated as examples in FIG. 4, in accordance with the inappropriate shift lever position driving score. FIGS. 10 and 11 are diagrams each showing an exemplary display format in which the display unit 16b is caused to display fuel-saving driving advice.

Alternatively, the fuel-saving driving advice generating unit 13 may generate a message from a message template promptly in response to each of the optimum shift lever position driving score and the inappropriate shift lever position driving score.

Figure 5:
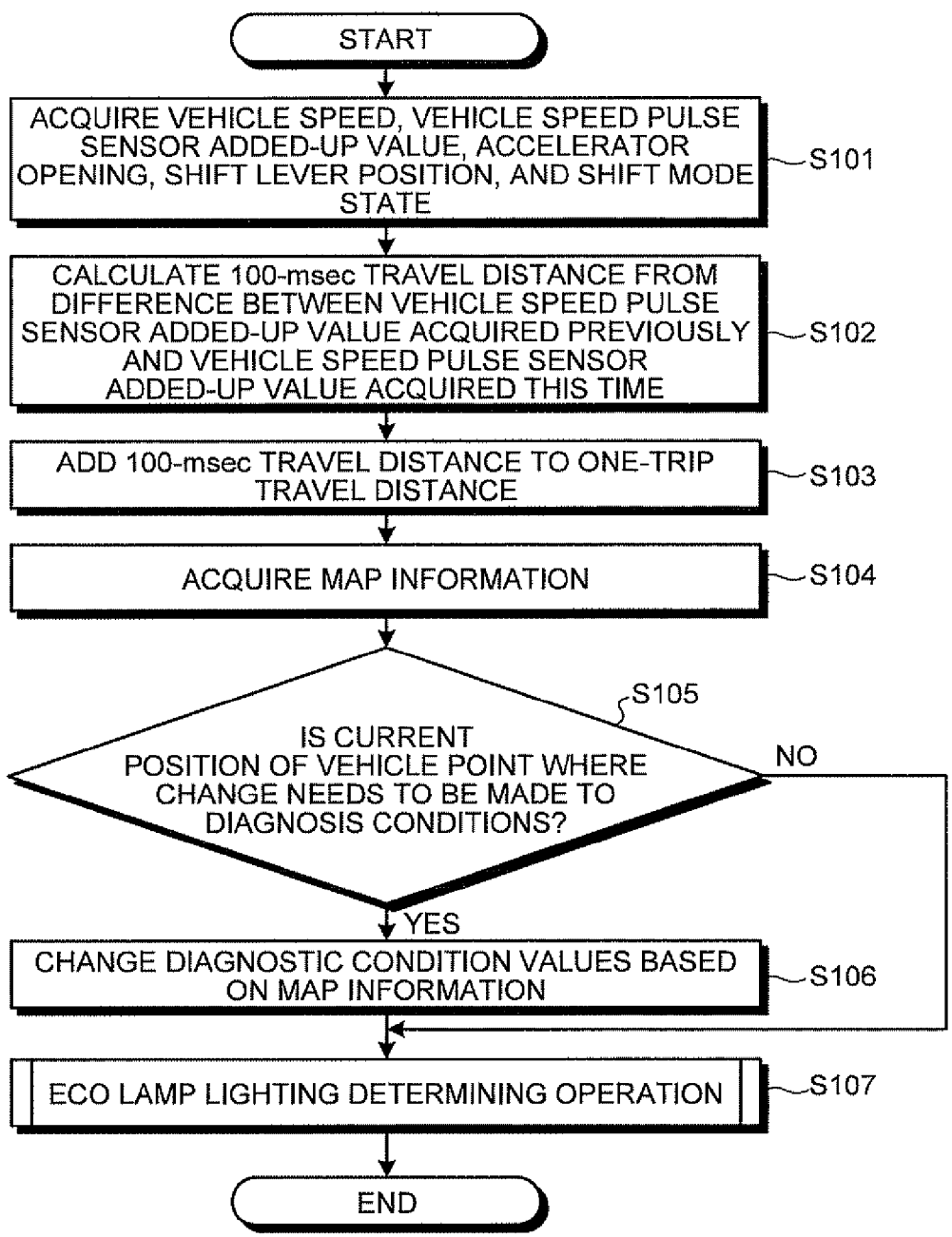
FIG. 5 is a flowchart illustrating the procedures of a fuel-saving driving diagnosing operation.

Next, a fuel-saving driving diagnosing operation to be performed by the fuel-saving driving diagnosing unit 11 of the fuel-saving driving diagnostic device 10a is described. FIG. 5 is a flowchart illustrating the procedures for the fuel-saving driving diagnosing operation. This operation is an operation to be performed every 100 milliseconds, for example. As illustrated in the figure, the diagnosis-condition managing unit 11a first acquires the vehicle speed, the vehicle speed pulse sensor added-up value, the accelerator opening, the shift lever position, and the shift mode state from the travel control device 20a (step S101).

The travel distance adding-up unit 11c then calculates the 100-msec travel distance from the difference between the vehicle speed pulse sensor added-up value acquired previously and the vehicle speed pulse sensor added-up value acquired this time (step S102). The travel distance adding-up unit 11c adds the 100-msec travel distance calculated at step S102 to the one-trip travel distance (step S103).

The diagnosis-condition managing unit 11a then acquires map information from the map information DB 17a (step S104). Based on the acquired map information, the diagnosis-condition managing unit 11a then determines whether the current position of the vehicle is a point where a change needs to be made to the diagnosis conditions (step S105). If it is determined to be a point where a change needs to be made to the diagnosis conditions ("Yes" at step S105), the operation moves on to step S106. If it is determined not to be a point where a change needs to be made to the diagnosis conditions ("No" at step S105), the operation moves on to step S107.

At step S106, the diagnosis-condition managing unit 11a changes the diagnosis conditions for fuel-saving driving, based on the acquired map information. At step S107, the eco lamp lighting determining unit 11b performs an eco lamp lighting determining operation. The eco lamp lighting determining operation will be described later in detail, with reference to FIG. 7. When this procedure is completed, the fuel-saving driving diagnosing operation comes to an end.

Figure 6:
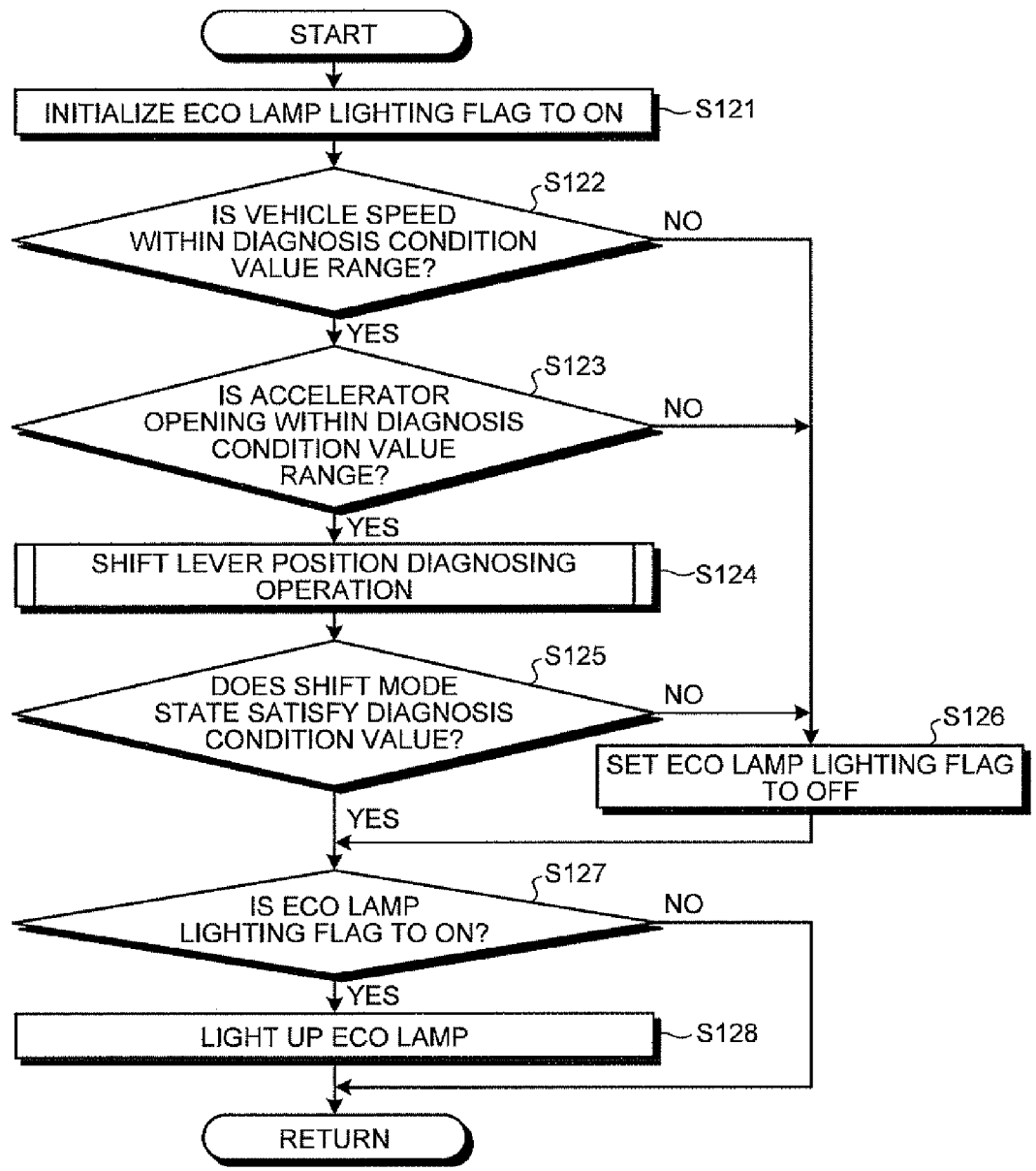
FIG. 6 is a flowchart illustrating the procedures of an eco lamp lighting determining operation.

Next, the eco lamp lighting determining operation depicted at S107 of FIG. 5 is described. FIG. 6 is a flowchart illustrating the procedures for an eco lamp lighting determining operation. As illustrated in the figure, the eco lamp lighting determining unit 11b first initializes an eco lamp lighting flag to on (step S121).

The eco lamp lighting determining unit 11b then determines whether the current vehicle speed is within a diagnosis condition value range (step S122). If the current vehicle speed is determined to be within the diagnosis condition value range ("Yes" at step S122), the operation moves on to step S123. If the current vehicle speed is determined not to be within the diagnosis condition value range ("No" at step S122), the operation moves on to step S126.

The eco lamp lighting determining unit 11b then determines whether the accelerator opening is within a diagnosis condition value range (step S123). If the accelerator opening is determined to be within the diagnosis condition value range ("Yes" at step S123), the operation moves on to step S124. If the accelerator opening is determined not to be within the diagnosis condition value range ("No" at step S123), the operation moves on to step S126.

The shift lever position determining unit 11b1 of the eco lamp lighting determining unit 11b then performs a shift lever position diagnosing operation. The shift lever position diagnosing operation will be described later in detail, with reference to FIG. 7.

The eco lamp lighting determining unit 11b then determines whether the shift mode state satisfies a diagnosis condition value (step S125). If the shift mode state is determined to satisfy a diagnosis condition value ("Yes" at step S125), the operation moves on to step S127. If the shift lever position is determined not to satisfy a diagnosis condition value ("No" at step S125), the operation moves on to step S126.

At step S126, the eco lamp lighting determining unit 11b sets the eco lamp lighting flag to off. At step S127, the eco lamp lighting determining unit 11b determines whether the eco lamp lighting flag is on. If the eco lamp lighting flag is determined to be on ("Yes" at step S127), the eco lamp lighting determining unit 11b lights the eco lamp 16a (step S128). When this procedure is completed, the eco lamp lighting determining operation comes to an end. If the eco lamp lighting flag is determined not to be on ("No" at step S127), the eco lamp lighting determining operation also comes to an end.

Figure 7:
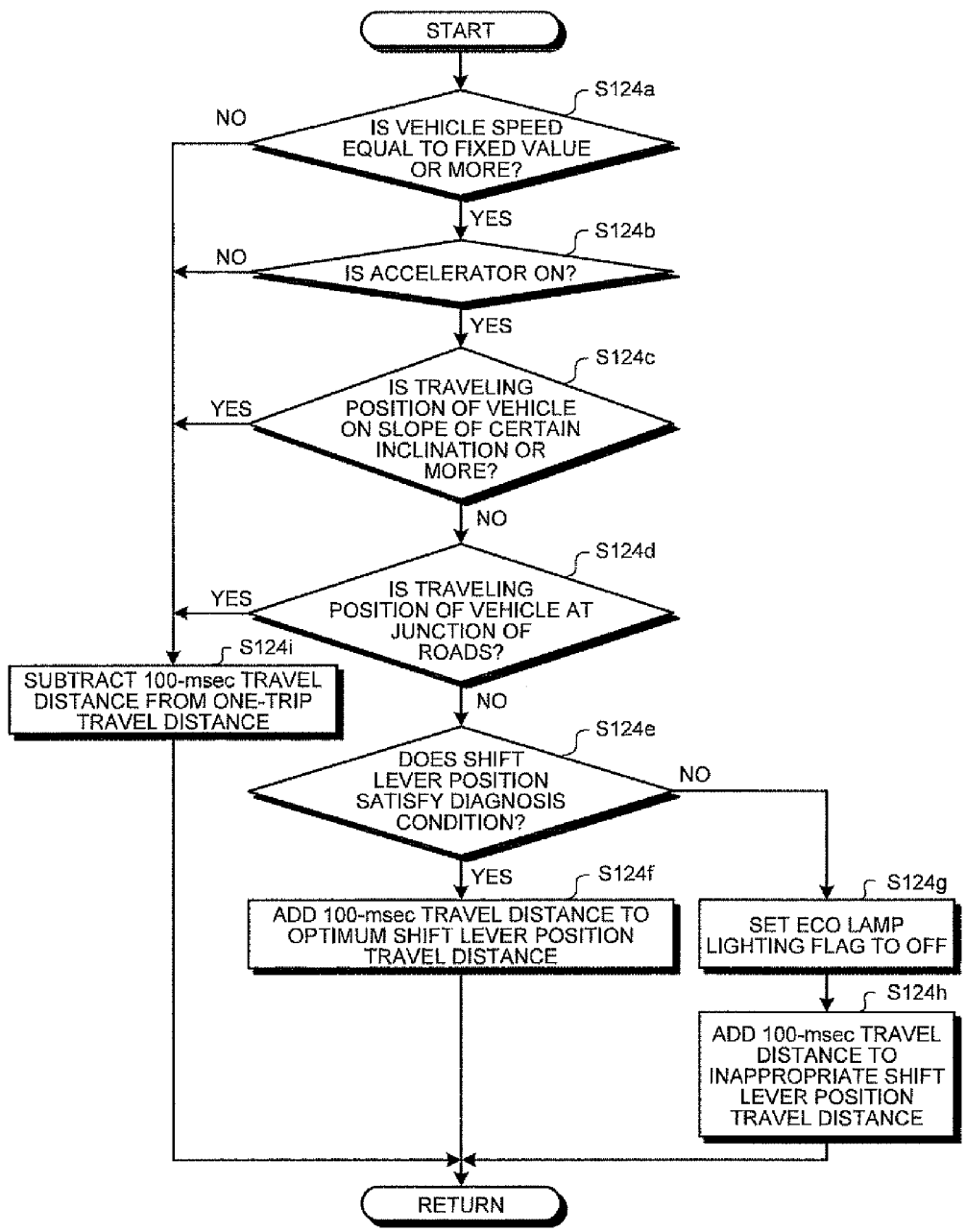
FIG. 7 is a flowchart illustrating the procedures of a shift lever position diagnosing operation.

Next, the shift lever position diagnosing operation depicted at step S124 of FIG. 6 is described. FIG. 7 is a flowchart illustrating the procedures for a shift lever position diagnosing operation. As illustrated in the figure, the travel situation determining unit 11a1 first determines whether the current vehicle speed acquired from the vehicle-speed sensor 26 is equal to a fixed value or more (step S124a).

If the current vehicle speed is determined to be equal to a fixed value or more ("Yes" at step S124a), the operation moves on to step S124b. If the current vehicle speed is determined not to be equal to a fixed value or more ("No" at step S124a), the operation moves on to step S124I.

The travel situation determining unit 11a1 then determines whether the accelerator is on based on the accelerator operation quantity acquired from the accelerator operation quantity sensor 27 (step S124b). If the accelerator is determined to be on ("Yes" at step S124b), the operation moves on to step S124c. If the accelerator is determined not to be on ("No" at step S124b), the operation moves on to step S124i.

The travel situation determining unit 11a1 then determines whether the traveling position of the vehicle 1a is on a slope of a certain inclination or more (step S124c). If the traveling position is determined to be on a slope of a certain inclination or more ("Yes" at step S124c), the operation moves on to step S124i. If the traveling position is determined not to be on a slope of a certain inclination or more ("No" at step S124c), the operation moves on to step S124d.

The travel situation determining unit 11a1 then determines whether the traveling position of the vehicle 1a is at a junction of roads (step S124d). If the traveling position is determined to be at a junction of roads ("Yes" at step S124d), the operation moves on to step S124i. If the traveling position is determined not to be at a junction of roads ("Yes" at step S124d), the operation moves on to step S124e.

The shift lever position determining unit 11b1 then determines whether the shift lever position in the vehicle 1a satisfies the diagnosis condition of the vehicle speed of an eco lamp lighting condition table (step S124e). If the shift lever position is determined to satisfy the diagnosis condition of the vehicle speed of the eco lamp lighting condition table ("Yes" at step S124e), the operation moves on to step S124f. If the shift lever position is determined not to satisfy the diagnosis condition of the vehicle speed of the eco lamp lighting condition table ("No" at step S124e), the operation moves on to step S124g.

At step S124f, the travel distance adding-up unit 11c adds the 100-msec travel distance to the optimum shift lever position travel distance. When this procedure is completed, the operation returns to the eco lamp lighting determining operation.

At step S124g, the shift lever position determining unit 11b1 sets the eco lamp lighting flag to off. The travel distance adding-up unit 11c then adds the 100-msec travel distance to the inappropriate shift lever position travel distance (step S124h). When this procedure is completed, the operation returns to the eco lamp lighting determining operation.

At step S124i, the travel situation determining unit 11a1 subtracts the 100-msec travel distance calculated at step S102 of FIG. 5 from the one-trip travel distance. Steps 124a to 124d set conditions for not performing the optimum shift lever position driving diagnosis, that is, restricting conditions for diagnostic scenes. In a situation where the vehicle 1a is caught in a traffic jam and travels at a low speed or repeatedly stops, for example, no significant rating result can be derived even if the optimum shift lever position driving diagnosis is performed.

That is, if, among the determinations at step S124a to step S124d, the determination at step S124a or step S124b is No or the determination at step S124c or S124d is Yes, no optimum shift lever position driving diagnosis is performed and the optimum shift lever position travel distance is not added up. When the optimum shift lever position travel distance is not added up because of the cancellation of the optimum shift lever position driving diagnosis, its meaning is clearly different from the case where the optimum shift lever position driving diagnosis is performed and then the optimum shift lever position travel distance is not added up. Therefore, to maintain reliability of the optimum shift lever position driving score, the 100-msec travel distance is subtracted from the one-trip travel distance.

Figure 8:
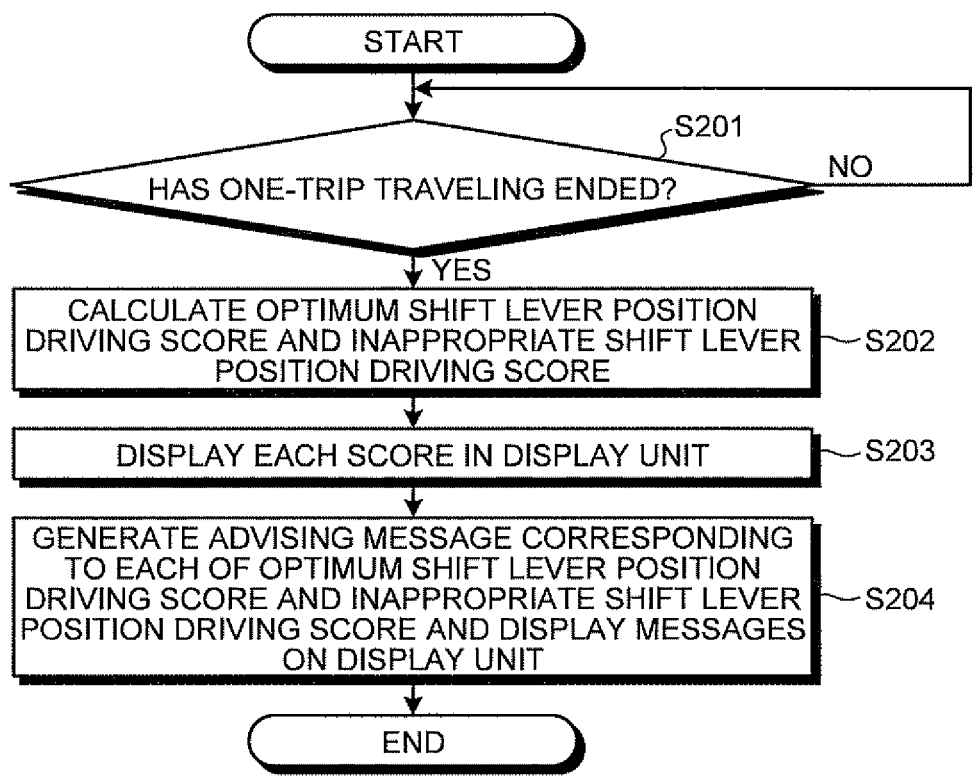
FIG. 8 is a flowchart illustrating the procedures of a shift lever position diagnosis rating result & advice notifying operation.

Next, a shift lever position diagnosis rating result & advice notifying operation to be performed by the fuel-saving driving rating unit 12 and the fuel-saving driving advice generating unit 13 of the fuel-saving driving diagnostic device 10a is described. FIG. 8 is a flowchart illustrating the procedures for the shift lever position diagnosis rating result & advice notifying operation. As illustrated in the figure, the fuel-saving driving rating unit 12 first determines whether one-trip traveling has been ended (step S201). If one-trip traveling is determined to have been ended ("Yes" at step S201), the operation moves on to step S202. If one-trip traveling is determined not to have been ended ("No" at step S201), step S201 is repeated.

At step S202, the fuel-saving driving rating unit 12 calculates an optimum shift lever position driving score and an inappropriate shift lever position driving score, based on the above described equations (1) and (2). The fuel-saving driving rating unit 12 then causes the display unit 16b to display the optimum shift lever position driving score and the inappropriate shift lever position driving score calculated through the procedures of step S202 (step S203).

The fuel-saving driving advice generating unit 13 then causes the display unit 16b to display advising messages to increase the driver's awareness about fuel-saving driving in accordance with the optimum shift lever position driving score and the inappropriate shift lever position driving score together with the optimum shift lever position driving score or the inappropriate shift lever position driving score (step S204). When this procedure is completed, the shift lever position diagnosis rating result and advice notifying operation comes to an end.

As described above, the rating results and the fuel-saving driving advice are presented to the driver. In this manner, it is possible to encourage the driver to drive by selecting the optimum shift lever position, and to raise awareness of the fuel-saving driving.

Figure 12:
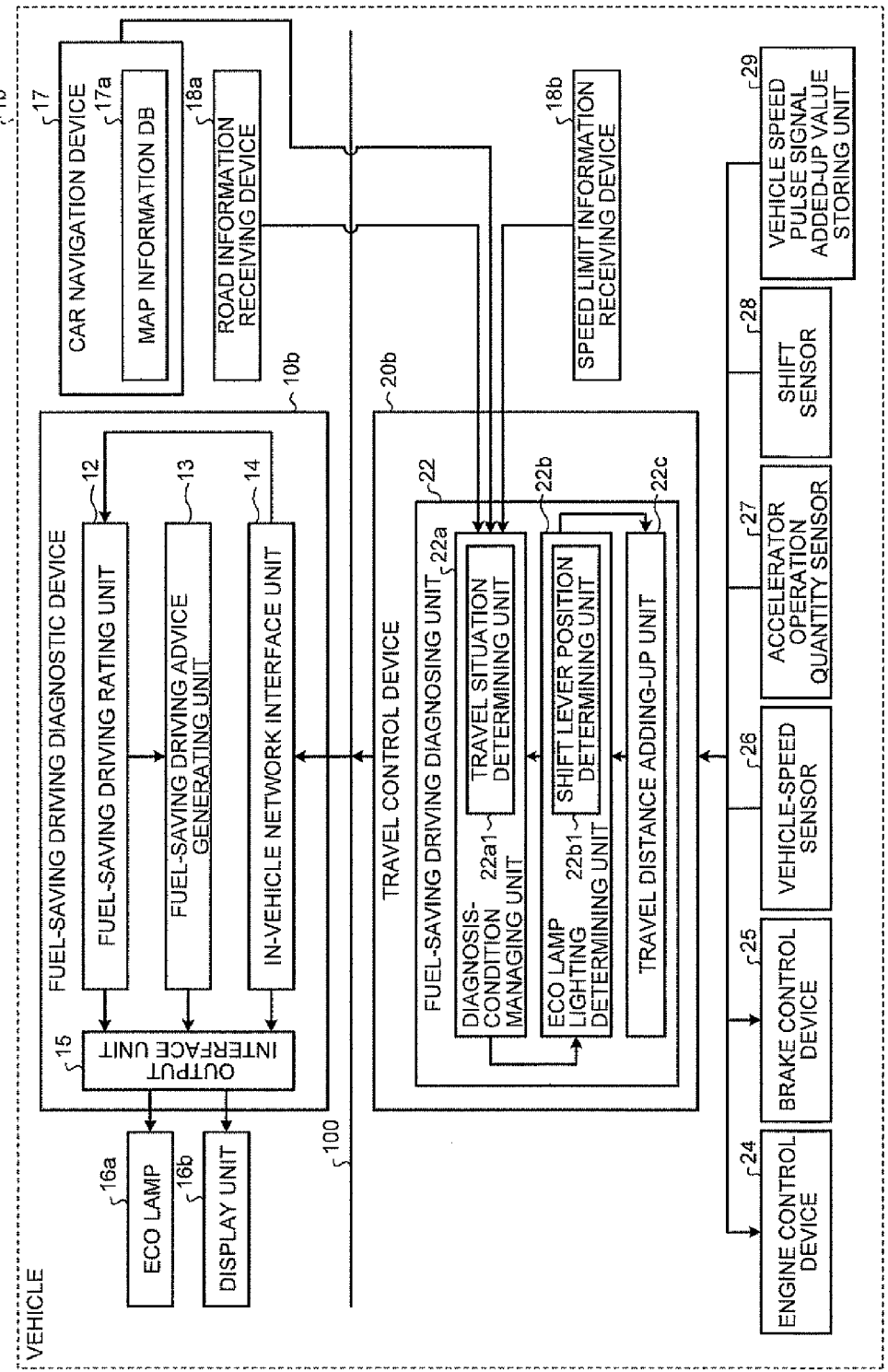
FIG. 12 is a block diagram illustrating the configuration of a fuel-saving driving diagnostic device and related devices according to an example of a modification.

As illustrated in the structures of a fuel-saving driving diagnostic device 10b and a travel control device 20b of a vehicle 1b in FIG. 12, the travel control device 20b may include a fuel-saving driving diagnosing unit 22, instead of the fuel-saving driving diagnostic device 10a including the fuel-saving driving diagnosing unit 11 in the vehicle 1a shown in FIG. 1. In this case, only the structures of the fuel-saving driving diagnostic device and the travel control device differ from those of the above described embodiment, and the configurations in other respects are the same as those of the above described embodiment. With this arrangement, the structure of the fuel-saving driving diagnostic device 10b can be simplified, and the processing load can be reduced.

It should be noted that a diagnosis-condition managing unit 22a, a travel situation determining unit 22a1, an eco lamp lighting determining unit 22b, a shift lever position determining unit 22b1, and a travel distance adding-up unit 22c of the fuel-saving driving diagnosing unit 22 have the same function and the structure as the diagnosis-condition managing unit 11a, the travel situation determining unit 11a1, the eco lamp lighting determining unit 11b, the shift lever position determining unit 11b1, and the travel distance adding-up unit 11c of the fuel-saving driving diagnosing unit 11 respectively.

In the vehicle 1b, the eco lamp lighting determining unit 22b and/or the travel distance adding-up unit 22c may be included in the fuel-saving driving diagnostic device 10b, rather than in the fuel-saving driving diagnosing unit 22. Further, the rating result and the advice may be notified to the driver of the vehicle 1a/1b by sound or voice rather than by visual display on the display unit 16b.

The example of the embodiment of the present invention has been described. The present invention, however, is not limited by the example above, and can be realized in various different embodiments within the scope of technical concept defined in the attached claims. Further, the effect described in relation to one example of the embodiment should not be taken as limiting the invention.

According to the above described example of an embodiment, the conditions for optimum shift lever position driving diagnosis are relaxed or tightened by taking into consideration the driving conditions of the vehicle and the optimum shift lever position driving diagnosis is not performed when predetermined conditions are satisfied. Accordingly, the precision of optimum shift lever position driving diagnoses can be made higher, and the accuracy of optimum shift lever position driving rating can also be made higher.

The example of the embodiment of the present invention has been described. The present invention, however, is not limited by the example above, and can be realized in various different embodiments within the scope of technical concept defined in the attached claims. Further, the effect described in relation to one example of the embodiment should not be taken as limiting the invention.

In the respective operations described in the above described example of an embodiment, all of or some of the operations described as operations to be automatically carried out may be manually carried out, or all of or some of the operations described as operations to be manually carried out may be automatically carried out in a known manner. Moreover, if not specifically mentioned, arbitrary changes may be made to the operation procedures, control procedures, specific names, and information containing various kinds of data and parameters described in the above example of an embodiment.

Also, each of the components of each device shown in the drawings is merely functional and conceptual, and does not need to be physically structured as in the drawings. Specifically, specific forms of division and integration of the devices are not limited to those shown in the drawings, but all or part thereof may be functionally or physically divided or integrated in an arbitrary unit, in accordance with various kinds of loads and the usage conditions.

Also, all of or arbitrary part of each processing function to be carried out in each device may be realized by a CPU (Central Processing Unit) (or a microcomputer such as a MPU (Micro Processing Unit) or a MCU (Micro Controller Unit)) and a program to be analyzed and executed by the CPU (or a microcomputer such as a MPU or MCU), or may be realized as hardware formed with wired logics.

Industrial Applicability

The disclosed fuel-saving driving diagnostic device, fuel-saving driving diagnostic system, travel control device, fuel-saving driving rating device and fuel-saving driving diagnostic method are useful to enable an absolute, objective, and fair determination of the information about fuel consumption and thereby to motivate the driver to improve his/her driving operations concerning the shift lever selection of a vehicle and to raise awareness of fuel-saving driving, and thus to make a contribution to environmental protection by reducing fuel consumption.

Reference Signs List 1a, 1b VEHICLE
10a, 10b FUEL-SAVING DRIVING DIAGNOSTIC DEVICE
11 FUEL-SAVING DRIVING DIAGNOSTIC UNIT
11a DIAGNOSIS-CONDITION MANAGING UNIT
11a1 TRAVEL SITUATION DETERMINING UNIT
11b ECO LAMP LIGHTING DETERMINING UNIT
11b1 SHIFT LEVER POSITION DETERMINING UNIT
11c TRAVEL DISTANCE ADDING-UP UNIT
12 FUEL-SAVING DRIVING RATING UNIT
13 FUEL-SAVING DRIVING ADVICE GENERATING UNIT
14 IN-VEHICLE NETWORK INTERFACE UNIT
15 OUTPUT INTERFACE UNIT
16a ECO LAMP
16b DISPLAY UNIT
17 CAR NAVIGATION DEVICE
17a MAP INFORMATION DB
18a ROAD INFORMATION RECEIVING DEVICE
18b SPEED LIMIT INFORMATION RECEIVING DEVICE
20a, 20b TRAVEL CONTROL DEVICE
22 FUEL-SAVING DRIVING DIAGNOSTIC UNIT
22a DIAGNOSIS-CONDITION MANAGING UNIT
22a1 TRAVEL SITUATION DETERMINING UNIT
22b ECO LAMP LIGHTING DETERMINING UNIT
22b1 SHIFT LEVER POSITION DETERMINING UNIT
22c TRAVEL DISTANCE ADDING-UP UNIT
24 ENGINE CONTROL DEVICE
25 BRAKE CONTROL DEVICE
26 VEHICLE-SPEED SENSOR
27 ACCELERATOR OPERATION QUANTITY SENSOR
28 SHIFT SENSOR
29 VEHICLE SPEED PULSE SIGNAL ADDED-UP VALUE STORING UNIT
100 IN-VEHICLE NETWORK

The invention claimed is:

1. A fuel-saving driving diagnostic device, comprising:
a condition managing unit that manages shift lever selection conditions, which are conditions of a shift lever selection position for determining that a vehicle is performing fuel-saving driving;
a shift lever selection condition determining unit that determines whether the shift lever selection position in the vehicle satisfies the shift lever selection conditions managed by the condition managing unit;
a travel situation determining unit that determines whether a travel situation of the vehicle is a predetermined travel situation based on road conditions, traffic conditions of a road on which the vehicle is traveling, speed limit information and information acquired by a travel control device; and
a fuel-saving driving diagnostic unit that diagnoses fuel-saving driving by determining whether to execute a determination by the shift lever selection condition determining unit in accordance with a determination result by the travel situation determining unit.

2. The fuel-saving driving diagnostic device according to claim 1, wherein the shift lever selection conditions are changed in accordance with road conditions or traffic conditions acquired by a road/traffic condition acquisition unit that acquires the road conditions or the traffic conditions.

3. The fuel-saving driving diagnostic device according to claim 1, wherein the determination by the shift lever selection condition determining unit is canceled in accordance with road conditions or traffic conditions acquired by a road/traffic condition acquisition unit that acquires the road conditions or the traffic conditions.

4. The fuel-saving driving diagnostic device according to claim 1, further comprising a fuel-saving driving rating unit that rates fuel-saving driving based on a determination target travel distance, which is a travel distance of the vehicle selected as a target for the determination by the shift lever selection condition determining unit, and a travel distance included in the determination target travel distance for which the shift lever selection condition determining unit determines that the shift lever selection position in the vehicle satisfies the shift lever selection conditions.

5. The fuel-saving driving diagnostic device according to claim 4, further comprising an advice generating unit that generates fuel-saving driving advice based on a rating result by the fuel-saving driving rating unit.

6. The fuel-saving driving diagnostic device according to claim 5, further comprising a notifying unit that notifies a driver of at least one of the rating result by the fuel-saving driving rating unit and the fuel-saving driving advice generated by the advice generating unit.

7. A fuel-saving driving diagnostic system that diagnoses fuel-saving driving of a vehicle, comprising:
a travel control device of the vehicle having a condition managing unit that manages shift lever selection conditions, which are conditions of a shift lever selection position for determining that a vehicle is performing fuel-saving driving, a shift lever selection condition determining unit that determines whether the shift lever selection position in the vehicle satisfies the shift lever selection conditions managed by the condition managing unit, a travel situation determining unit that determines whether a travel situation of the vehicle is a predetermined travel situation based on road conditions, traffic conditions of a road on which the vehicle is traveling, speed limit information and information acquired by the travel control device, and a fuel-saving driving diagnostic unit that diagnoses fuel-saving driving by determining whether to execute a determination by the shift lever selection condition determining unit in accordance with a determination result by the travel situation determining unit; and
a fuel-saving driving rating device having a fuel-saving driving rating unit that rates fuel-saving driving based on a determination target travel distance, which is a travel distance of the vehicle selected as a target for the determination by the shift lever selection condition determining unit, and a travel distance included in the determination target travel distance for which the shift lever selection condition determining unit determines that the shift lever selection position in the vehicle satisfies the shift lever selection conditions.

8. The fuel-saving driving diagnostic system according to claim 7, wherein the shift lever selection conditions are changed in accordance with road conditions or traffic conditions acquired by a road/traffic condition acquisition unit that acquires the road conditions or the traffic conditions.

9. A fuel-saving driving diagnostic system according to claim 7, wherein the determination by the shift lever selection condition determining unit is canceled in accordance with road conditions or traffic conditions acquired by a road/traffic condition acquisition unit that acquires the road conditions or the traffic conditions.

10. A fuel-saving driving diagnostic method executed by a fuel-saving driving diagnostic system that diagnoses fuel-saving driving of a vehicle, comprising:
firstly determining whether a shift lever selection position in the vehicle satisfies shift lever selection conditions, which are conditions of the shift lever selection position for determining that the vehicle is performing fuel-saving driving;
secondly determining whether a travel situation of the vehicle is a predetermined travel situation based on road conditions, traffic conditions of a road on which the vehicle is traveling, speed limit information and information acquired by a travel control device;
diagnosing the fuel-saving driving by determining whether to execute a determination in the firstly determining in accordance with a determination result in the secondly determining; and
rating the fuel-saving driving based on a determination target travel distance, which is a travel distance of the vehicle selected as a target for the determination in the firstly determining, and a travel distance included in the determination target travel distance for which it is determined in the firstly determining that the shift lever selection position in the vehicle satisfies the shift lever selection conditions.

11. The fuel-saving driving diagnostic device according to claim 1, wherein the information acquired by the travel control device includes at least a current value of a vehicle speed, a current value of an accelerator opening, a shift lever position and a shift mode state in an eco-lamp lighting determining condition table.

12. The fuel-saving driving diagnostic system according to claim 7, wherein the information acquired by the travel control device includes at least a current value of a vehicle speed, a current value of an accelerator opening, a shift lever position and a shift mode state in an eco-lamp lighting determining condition table.

13. The fuel-saving driving diagnostic method according to claim 10, wherein the information acquired by the travel control device includes at least a current value of a vehicle speed, a current value of an accelerator opening, a shift lever position and a shift mode state in an eco-lamp lighting determining condition table.

* * * * *